United States Patent [19]

Coffee et al.

[11] 4,190,679
[45] Feb. 26, 1980

[54] MEATY TEXTURED PET FOOD

[75] Inventors: Harold R. Coffee, Baltimore; Gordon G. Varcoe, Cobourg, both of Canada; Ronald J. Triani, Brookfield Center; George S. Hayden, New Fairfield, both of Conn.

[73] Assignee: General Foods Corporation, White Plains, N.Y.

[21] Appl. No.: 791,099

[22] Filed: Apr. 26, 1977

[51] Int. Cl.$^2$ .............................................. A23K 1/00
[52] U.S. Cl. ................................ 426/623; 426/335; 426/449; 426/630; 426/641; 426/805
[58] Field of Search ............... 426/641, 630, 321, 335, 426/532, 622, 623, 634, 635, 656, 657, 447, 448, 518, 802, 805, 449

[56] References Cited

U.S. PATENT DOCUMENTS

| | | | |
|---|---|---|---|
| 3,119,691 | 1/1964 | Ludington et al. | 426/302 X |
| 3,732,112 | 5/1977 | Frankenfeld et al. | 426/335 X |
| 3,745,021 | 7/1973 | Middlesworth et al. | 426/805 X |
| 3,959,511 | 5/1976 | Balaz et al. | 426/805 X |
| 4,006,266 | 2/1977 | Bone et al. | 426/805 X |
| 4,011,345 | 3/1977 | Bartsch | 426/656 X |

*Primary Examiner*—R. B. Penland
*Attorney, Agent, or Firm*—Mitchell E. Alter; Daniel J. Donovan; Bruno P. Struzzi

[57] ABSTRACT

Disclosed is a uniquely textured pet food in the form of low-intermediate moisture, but highly-palatable, resilient, soft, meat-like chunks. These soft, chewy chunks are expanded internally and have a substantially-continuous, fibrous, highly-irregular surface. This pet food is prepared by relatively high pressure extrusion of a plasticized, meat based formulation to achieve expansion. The product contains sufficient $a_w$ lowering and antimycotic agents to avoid spoilage when packaged under aerobic conditions. By virtue of their meat-like texture and structural integrity, these chunks enable the production of an unusually good dual-textured pet food.

1 Claim, No Drawings

MEATY TEXTURED PET FOOD

BACKGROUND OF THE INVENTION

With the advent of intermediate moisture pet foods, it became possible to package palatable, moist, meat-containing products under aerobic conditions without the use of expensive hot-packaging or retorting procedures. These products, which generally have moisture contents intermediate those of dry and canned-type pet foods, have enjoyed considerable commercial success in the recent past. The present invention provides an improved product of this type, as well as a dual textured pet food containing a soft-moist portion and dry crunchy pieces.

While quite palatable because of their semi-moist character and the presence of meat, most intermediate-moisture pet foods suffer a penalty in texture over natural meat due to the need to finely chop or comminute the meat during processing. Some prior art products have attempted to overcome this problem by employing proteinaceous or other binders to gel the formulation into a more-resilient, less-plastic form. For example, see U.S. Pat. No. 3,380,832 to Bone. While this approach has been successful to some degree, the products produced in this manner are quite costly due to the added expense of the gellable binders. Moreover, these gelled structures still lack a fibrous, meat-like texture. It would, therefore, be desirable to have a soft pet food which more nearly resembles natural meat in texture and appearance. It would be especially desirable if this product could be made from either fresh meat or dried meat meal, without the need for employing a high cost gelling agent to obtain a resilient, meat-like character.

The cost advantage to the consumer by buying a soft-moist pet food instead of buying a high-quality canned-type dog food can be significant, but the cost penalty versus dry-type pet foods can also be significant. It would therefore be desirable to retain the soft-moist palatability advantage over dry, but at the same time, somehow, reduce the cost of the formulation.

It has been found that simply using a less expensive formulation does not maintain palatability at the desired high level. As an alternative, British Pat. No. 1,312,910 to Baker et al suggests making expanded pet foods having moisture contents below 10% by employing 10 to 50% of an organic solvent such as glycerol and propylene glycol; however, products having such low levels of moisture and requiring high levels of polyhydric alcohols to obtain a suitable, soft texture are lower in palatability and higher in cost than would be desirable. Therefore, there still remains a need for a way to provide a palatable soft-moist pet food using lower cost ingredients.

Moreover, conventional dry pet foods are not without advantages of their own, and it would be desirable to provide a pet food which retains these advantages while also having the advantages of soft-moist foods. The dry foods, because of their crunchy texture, satisfy the needs and desires of certain pets, especially dogs, to chew relatively hard, coarse materials. Such chewing action is essential for proper oral health, and if the desire to chew is not satisfied by virtue of the pet's diet, it will almost certainly be alleviated to some degree by chewing other, albeit more costly, objects which yield similar benefits. Moreover, the dry pet foods are quite economical as compared to the intermediate-moisture variety.

It would clearly by desirable to obtain the relative advantages of both dry and intermediate-moisture pet foods in a single ration. One obvious possibility would be to provide a combination food, having both dry and intermediate-moisture portions. A product of this type is suggested in U.S. Pat. No. 3,962,462; however, because of the differing moistures between the two portions, the moisture tends to migrate from the soft-moist portion into the dry portion causing the dry portion to lose its crunchiness. And, because the soft portion loses some of its moisture, it suffers textural deterioration and loses its moist eating quality. The disclosures of U.S. Pat. Nos. 3,916,029 and 3,922,353 suggest employing phases of different moisture contents but do not teach the preparation of a food having strong textural contrasts. In another approach to the problem, as described in U.S. Pat. Nos. 3,883,672, 3,942,921 and 3,959,511, and U.S. B 478,759, a soft dry component is mixed with a hard dry component to obtain the textural contrast.

The use of conventionally prepared soft-moist products, such as those discussed in U.S. Pat. No. 3,202,514 to Burgess et al, with dry crunchy pieces has never been successful where strong textural contrast was desired. Conventional soft-moist products are highly susceptible to breakage and disintegration under ordinary conditions of shipping and handling when packaged with hard, dry pieces. Thus, conventional soft-moist pet food formulations are, as such, unsuitable for a commercially sound dual-texture product, espcially one targeted for sale at a price lower than soft-moist because of the increased material and packaging costs which would be necessary to control breakage and costs of product lost to breakage in delivery even where precautions are taken. The soft pieces must be structurally sound even when subjected to repeated impact by the hard, dry chunks. Thus, there is a present need for a highly-palatable, dual-textured pet food which exhibits the desired attributes of both soft-moist and dry pet foods and produces significant economies to the consumer as compared to high quality soft-moist pet foods, and while the art has endeavored to find such a product, it has fallen short in each attempt in one or more respects.

SUMMARY OF THE INVENTION

It is an object of the present invention to provide an economical textured pet food in the form of soft, moist, textured, resilient, meat-like chunks of relatively high palatability.

It is another object of the present invention to provide a process for preparing an economical textured pet food in the form of soft, moist, textured, resilient, meat-like chunks.

It is another object of the present invention to provide an economical, highly-palatable, dual-textured pet food containing a soft, moist, textured, resilient meat-like portion.

It is yet another object of the present invention to provide a process for preparing a highly-palatable, dual-textured pet food which contains a soft, moist, textured, resilient, meat-like portion and enables significant economies to the consumer versus high quality soft-moist pet foods.

It is a more specific object of the present invention to provide an economical dual-textured pet food having a crunchy portion and a moist, soft, resilient, meat-like portion wherein the two portions retain their distinct textural attributes, remain stable to microbiological deterioration and withstand breakage, under usual conditions of commercial handling, shipping and storage.

These and other objects are obtained according to the present invention which provides a textured pet food, and a method for making it, wherein the pet food comprises resilient, textured, meat-like chunks having an expanded structure internally and an external substantially-continuous, fibrous, highly-irregular skin, and having a moisture content in the range of from greater than 15% up to 25%, an $a_w$ of from 0.5 to 0.90, a resilience of greater than 20%, and a bulk density of from 18 to 25 lb/ft$^3$, and comprising from above 25 to about 60% farinaceous material and from 2 to 15% of a polyhydric alcohol.

The process for preparing this textured pet food according to the present invention comprises:

heating a mixture comprising from 20 to 60% of proteinaceous material, from above 25% up to 60% of a farinaceous material, from 2 to 15% of a polyhydric alcohol, and effective levels of preservatives in combination with the polyhydric alcohol, to provide microbiological stability in the final product, under conditions effective to provide a plasticized blend of the ingredients at a moisture content of from 20 to 35%; subjecting the plasticized blend to a temperature of from about 250° to about 350° F. and a pressure of greater than 100 psig in a screw-fed extruder; expressing the plasticized material from at least one orifice in an extruder die into an area of substantially lower pressure to thereby expand the blend from 1.5 to 2.7 times the diameter of the orifice from which it is expressed; and cutting the extruded material upon exiting the orifice by a blade spaced from the die to thereby cause a ripping and tearing of the chunk to provide a meaty appearance.

The more specific objects of this invention relating to the dual-textured pet food are achieved by mixing the soft, meat-like chunks of this invention, having a high degree of resilience and structural integrity and having an $a_w$ of from 0.50 to 0.75, with crunchy chunks of pet food having substantially the same $a_w$ as the soft, textured chunks.

DETAILED DESCRIPTION

The textured pet food of this invention is based on a soft, resilient, moist, meat-like portion which has a moisture content within the range of from above 15% up to 25% and an $a_w$ of from 0.50 to 0.90. Thus, this soft, meat-like portion has a moisture content near the lower portion of the range of what is conventionally considered intermediate-moisture, e.g. 15 to 50%. Preferred moisture contents fall within the range of from 16 to 20%.

Internally, the soft, meat-like pet food chunks have an expanded structure which, in combination with the external, substantially continuous, i.e. non-porous, skin and highly irregular configuration, provides a meat-like resilience and chew.

These textured pet food chunks must be meaty in appearance and texture, with good resilience, to obtain the desired product characteristics. They must possess the necessary resilience to provide a resistance to bite and chew to simulate these same properties in natural meat. Moreover, they must have the ability, when packaged in combination with the hard, crunchy portion of a dual-textured food to withstand breakage under normal conditions of commercial handling.

Resilience is the capability of a strained body to recover its size and shape after deformation caused especially by compressive stress. We believe that it would be helpful in understanding the term resilient to define it in objective terms. We therefore adopt the compressive technique for determining resilience. This involves placing a sample having an average length of 0.79 inches, an average width of 0.59 inches, and an average height of 0.39 inches, on the load cell of an Instron Universal Testing Machine and compressing it with a flat plate to one-third of its original height at a crosshead speed of ten inches per minute and a chart speed of fifty inches per minute. The sample is consecutively compressed five times, and the force-distance patterns (work function, area under the curve=A) recorded for each compression. The ratio of the work functions of the fifty to the first compressions ($A_5/A_1$) is taken as a quantitative measure of resilience. The resilience values, thus determined are expressed as percentages. It is to be understood that while other objective resilience tests are known which may show different numerical values, our work has relied upon the above technique to help define our advance over the prior art in objective terms and this technique should therefore be employed as the standard for comparison. The soft chunks should have resilience values of at least 20%, and preferably will be within the range of from 30 to 50%.

This soft, meaty portion should obviously be soft. To aid in describing this term, we again believe that it is necessary to convert this subjective concept into objective terms, and therefore adopt the compression technique for determining firmness. This involves placing the sample between two rigid plates mounted in an Instron Universal Testing Machine, compressing the sample at the crosshead speed of 1 in/min to about 50% of its initial height and determining firmness as the slope of the force deformation curve. Firmness values are expressed as pounds force per square inch of compressed sample area per inch of sample compression, or lb/in$^3$. It is to be understood that while other objective firmness tests are known, and many show different numerical values, our work has relied upon this technique to help define our advance over the prior art in objective terms and this technique should therefore be employed as the standard for comparison. Furthermore, it is to be understood that the firmness values as obtained with the employed technique are dependent on the size of the sample tested, i.e., the surface area in contact with the compressing surface. Samples employed for the testing specified here had a surface area of 0.4–1.0 in$^2$, average value of 0.7 in$^2$, for the soft part, and of 0.4–0.7 in$^2$, average value of 0.5 in$^2$, for the crunchy part. The soft chunks should exhibit a firmness within the range of about 6 to about 225 lb/in$^3$, preferably from about 7 to about 130 lb/in$^3$, and most preferably from about 10 to about 110 lb/in$^3$.

To aid in obtaining the desired soft, resilient texture and to provide a controlled water activity in the product, a plasticizing polyhydric alcohol is employed at a level of at least 2% up to 15%, but preferably from greater than 5%, up to 9%. Suitable for use as the plasticizing agent are any of the normally liquid, edible di-, or tri-hydric alcohols or sugar alcohols or other polyhydric alcohols effective for this purpose. Typical among these are 1,2-propanediol, 1,3-butanediol, glycerol, and mixtures of these. It has been found that due to its highly effective plasticizing effect, glycerol is a preferred material.

In addition to the plasticizing polyol, the formulation must also contain sufficient other materials capable of arresting microbial growth in the composition. Among these are the low molecular weight materials capable of providing strong osmotic pressure effects, of the type suggested by Burgess et al in U.S. Pat. No. 3,202,514. This Burgess et al patent is, therefore, incorporated by reference. Of these, sugars and salts are the most preferred; with sugars such as corn syrups and sucrose, and salts such as sodium chloride, being the preferred water activity, $a_w$, lowering materials. It has been found according to the invention that high fructose corn syrups and those having dextrose equivalent, DE, values of from about 30 to 75 are especially desired ingredients because they not only have an $a_w$ lowering effect, but they also provide a degree of palatability desired by dogs and help to maintain product plasticity. The exact reason for the high palatability of the products produced according to this invention has not as yet been isolated, but it is believed due to the use of the novel formulation, especially when processed in the manner hereinafter described. This formulation will preferably include from about 4% to about 15% corn syrup on a dry basis, based on the weight of the total composition including moisture.

To provide a truly moist food, the soft chunks should contain at least 15% moisture, and preferably will contain between 16 and 20% moisture. To assure product stability however, the moisture should not exceed 25% and the soft chunks should also have an $a_w$ of from 0.50 to 0.90, and contain sufficient amounts of plasticizer to obtain the desired firmness values of from about 6 to about 225 lb/in$^3$. Apart from these criteria, it is preferred to provide sufficient nutritional ingredients in the soft chunks to, alone or in combination with a dry, crunchy portion, achieve a nutritionally-balanced, full-feeding pet food.

To formulate the soft, textured pet food to provide a full-feeding, nutritionally-balanced diet as well as provide the desired product and processing characteristics according to the invention, it is necessary to employ from 20 to 60% of proteinaceous materials and from 25 to 60% of farinaceous materials.

The proteinaceous materials should provide good-quality protein from both the nutritional and functional standpoints. Thus, not only is it necessary as a practical matter of pet nutrition to provide the proper balance of protein necessary for a full-feeding food, but it is also necessary for the proteins to function properly under processing conditions to provide the desired chewy, resilient, meat-like texture.

Suitable as proteinaceous materials according to this invention are proteinaceous meaty materials and vegetable protein sources, as well as, if required, ration-balancing proteins. The term "proteinaceous meaty material" refers to the group consisting of meat, meat by-products and meat meal as well as mixtures of these. The term "meat" is understood to apply not only to the flesh of cattle, swine, sheep and goats, but also horses, whale and other mammals, poultry and fish. The term "meat by-products" is intended to refer to those non-rendered parts of the carcass of slaughtered animals including but not restricted to mammals, poultry and the like and including such constituents are are embraced by the term "meat by-products" in the Definitions of Feed Ingredients published by the Association of American Feed Control Officials, Incorporated. Likewise, the term "meat meal" refers to the finely ground, dry rendered residue from animal tissues including those dried residues embraced by the term in the aforesaid official definition of the Association of American Feed Control Officials, Incorporated. Indeed, the terms "meat," "meat by-products," and "meat meal" are understood to apply to all of those animal, poultry and marine products defined by said association.

The term "vegetable protein source or concentrate" applies to oil seeds and legumes; as well as the oil-expressed or extracted meals and cakes and protein isolates and concentrates thereof recovered by known procedures including acid or alkali digestion and precipitation; typical of such vegetable protein sources are soybeans, soybean meal, cotton seed meal, alfalfa protein, peanuts, peanut meal, etc., all of which terms are well understood and similarly defined or understood by said association.

The term "ration-balancing protein supplement" is intended principally to refer to milk products as defined by said association and hence includes such additives as dried buttermilk, dried skimmed milk, dried whole whey, casein and cheese rind, although it also includes yeast as that term is defined by said association and hence refers to such materials as distillers' dried yeast, primary dried yeast, irradiated dried yeast, brewers' dried yeast and torula dried yeast. However, the term protein supplements is not to be understood as restricted to the aforesaid definition and includes such things as single cell protein and the like.

While economy products containing no fresh meat are within the scope of this invention preferably, the product will contain at least 10%, but no more than about 25% of fresh meat. The remainder of the protein for the product will be provided by a vegetable protein source or concentrate or a ration-balancing protein supplement. Typically, soy flour is employed in an amount of greater than about 10% and up to about 40% of the total composition. Preferably, soy flour or other like protein source is employed in an amount of from 12% to about 25% of the weight of the total composition.

The farinaceous component also provides both nutritional and functional characteristics in the food. Among the suitable farinaceous materials are grains such as corn, wheat, barley, oats, and the like, as well as the normal milling products of these materials such as whole ground wheat, corn flour, and the like. While the farinaceous material can comprise from above 25 up to 60% of the total pet food and be derived from a single source, it is preferred, for best nutrition, functionality and economy to employ at least two different farinaceous materials at a combined level of from 30 to 50%. One preferred combination is wheat and corn at a weight ratio of from 3:2 to 2:3.

In addition to these materials, the preferred pet food formulations will also contain vitamin and mineral supplements necessary to provide balanced nutrition. Additionally, due to the relatively high moisture contents of these foods as opposed to dry foods and the incapability of most of the noted osmotic agents to inhibit all microbial growth, effective levels of antimycotic agents such as potassium sorbate are desirably employed to assure stability against microbial growth.

In processing these formulations to obtain the unique textural characteristics of the soft, meat-like piece desired according to the present invention, the ingredients are mixed, plasticized under heat and pressure, extruded under conditions which cause expansion and texturization, and cut into chunks. These chunks are then preferably coated with a layer of a palatability improving material such as fat, meat-derived flavors, hydrolyzed vegetable protein, meat slurries and the like.

The ingredients can be mixed in any manner which is effective to provide a sufficiently homogenous blend to premit efficient plasticization in the extruder. In a preferred processing arrangement, the ingredients are mixed in a suitable mixing device, such as a ribbon blender. The resulting mixture is then fed into a steam jacketed preconditioning chamber wherein it is mixed with live steam and sufficient water to maintain the moisture at a level of from about 20 to about 30% to assure the desired final moisture content. A residence time of about 0.25 to 2 minutes is sufficient to cook and adequately plasticize the mixture which will achieve a temperature of from about 150° to about 200° F. upon exit. The steam jacket is preferably heated with steam at a pressure of from about 20 to about 80 psig, preferably about 60 psig.

The cooked formulation is then fed into a plasticizerextruder wherein it is further heated and plasticized under pressure. The formulation will attain a temperature of from about 250° to about 350° F., preferably from 285° to 315° F. within the extruder while being subjected to pressures of above 100 psig. This plasticization prepares the material for providing a soft, resilient texture upon extrusion and heats the material to such a degree under the requisite pressure to assure expansion of the formulation upon exiting the extruder. The pressure drop upon exiting the extruder should be at least about 100 psig. Formulations having lower moisture contents will need to be subjected to higher pressures within this range, and higher moisture formulations will require the lower pressures within this range.

An ideal degree of expansion provides about 1.75 to 2.25 times expansion based on the diameter of the extrudate as compared to the diameter of the die orifice from which it is expressed with acceptable degrees of expansion providing an extrudate being from about 1.50 to 2.75 times the diameter of the orifice. The extrusion conditions will be varied as required to obtain the desired degree of expansion.

The product is preferably severed as it issues from the orifice die face at the end of the extruder. By spacing the cutting blade a small distance from the die face, a pleasing, irregularly-shaped chunk can be obtained due to a ripping action caused by this arrangement. Preferably, the blade is spaced from about ⅛ inch to about ⅜ inch from the die plate. The chunks formed in this manner show a moderately expanded, meat-like interior with a substantially-continuous, fibrous and highly-irregular surface. When extrudated and cut in the preferred manner, the product shows a bulk density of from about 18 to 25 lb/ft$^3$, and is preferably from about 20 to 22 lb/ft$^3$, these densities being necessary to obtain the desired fibrous, resilient, meaty texture and product appearance.

While the pet food at this point will provide a desirable animal ration, a coating of a palatability improving material can be applied. Coatings of beef tallow, sprayed on in an amount of from about 2 to about 8% based on the weight of the pet food, have proved to be desirable. Likewise other coatings such as meat meal, meat flavors, gravy formers, and the like can be applied.

According to a highly desirable embodiment of this invention, these soft, resilient, meat-like chunks are mixed with a conventional dry, crunchy animal food ration, such as that disclosed in U.S. Pat. No. 3,119,691 to Ludington et al, which disclosure is incorporated by reference. This dry crunchy portion will preferably have an expanded structure and will typically include from 35 to 70% farinaceous ingredients and from 20 to 50% proteinaceous ingredients based on the weight of the total mixture. The dry portion is formulated to provide a nutritionally-balanced, full-feeding animal ration when employed in the dual-textured food. The provision of a dual-textured food is greatly enhanced through the use of the soft, meat-like chunks of the present invention due to their high resilience and structural strength which obviates the problem of product breakage or disintegration even though one portion is soft and one portion is hard.

Important to the obtainment of a dual-textured product is the need to provide distinctly soft and distinctly crunchy portions, each having a noticeably different texture from the other and being stable texturally and structurally in the presence of the other. Thus, where the soft portion should have a firmness within the range of about 6 to about 225 lb/in$^3$, preferably from about 7 to 130 lb/in$^3$, and most preferably from about 10 to about 110 lb/in$^3$; the crunchy portion should have a firmness within the range of about 1400 to about 9500 lb/in$^3$, preferably about 2500 to about 5200 lb/in$^3$. It is also necessary that the two portions exhibit a difference in firmness of at least about 1200 lb/in$^3$, preferably from about 2500 to about 5200 lb/in$^3$. Additionally, the soft piece must be resilient and capable of withstanding repeated impacts by the crunchy portion. Thus, the resilience values of 20 to 80%, and preferably 30 and 50%, are required for the soft pieces. Where these criteria are achieved, significant oral health, convenience, cost and palatability advantages can be obtained.

The processing to form the dry, crunchy portion can be in substantial accordance with the procedure set out in U.S. Pat. No. 3,119,691 to Ludington et al. The dry ingredients are mixed together to form a mixture having a moisture content typically between 7 and 10%. The moisture content of the mixture is then raised to between about 20% and 30% by the addition of moisture in the form of water or steam with continued mixing for about 1 to 6 minutes. The mixture is then fed to an extruder-cooker wherein it is subjected to mechanical working under pressure and at elevated temperatures, generally above 212° F. and typically between 240° F. to 300° F. Steam and/or water is typically injected to control moisture and temperature. Instead of the pre-moistened step above-mentioned, all the additional moisture can be added during the extrusion-cooking step. The residence time of the mixture within the extruder is relatively short and is generally on the order of from about 15 to about 120 seconds. During this extrusion step, the farinaceous component of the mixture at least partially gelatinizes and expands. The product exits the extruder through a suitable die of desired size to form an expanded rope structure having a moisture content of from about 20 to 50%. The extruded rope is cut into the desired kib form and is then dried, generally stagewise, at temperatures between about 220° F. to 300° F. for about 5 to 20 minutes to a moisture content of from about 6 to 13%.

These dry, crunch pieces are preferably coated with a palatability improving material to avoid any problem of the pets selectively picking the soft meat-like chunks and leaving the dry crunchy portion. While not typical, it is also contemplated that a like coating can be applied to the soft portion. Among the suitable coatings are tallow and other fats, enzymatically treated materials of the kind discussed by Haas et al in U.S. Pat. No. 3,857,968, meat meal alone or with fat, meat flavors such as hydrolyzed vegetable protein, and the like. The purpose of such a coating is to balance the palatability of the two portions such that one portion is not discriminately preferred to the other, and also to maintain an overall high level of palatability for the dual-textured food.

The water activities, i.e. $a_w$ values of the two portions are balanced to the degree necessary to retain the textures of the individual portions and the textural contrast between them. Preferably, the $a_w$ values of the two portions should be substantially the same within the range of from 0.5 to 0.75 and preferably within the range of from 0.55 to 0.65. They may be different by as much as about 0.1, but preferably are controlled to within about 0.05 of each other. Consistent with the textural criteria, they should most preferably differ by no more than 0.03. Advantageously, by employing an initially higher $a_w$ in the dry portion, any moisture migration which occurs will actually favor textrual contrast.

The moisture contents of the two portions should be maintained within the noted ranges and be consistent with the requirement that both portions also have distinct textural criteria. However, where the $a_w$ values are controlled in proper manner, the moisture contents of the two portions can be quite widely divergent without any adverse effects in the combined product. Typically, the two portions should not have differences in moisture contents any greater than 5%.

The final moisture contents and the $a_w$ values for the two portions individually can be achieved during the preparation of these separate portions, or, alternatively, they can be achieved after mixing the two portions. For example, where there is any significant difference between the moisture contents and the $a_w$ values for the separate pieces upon mixing, they will tend toward intermediate equilibrium values, and it is therefore possible to allow some variation from the required values for the separate portions as produced and permit the establishment of equilibrium after mixing, either before or after packaging, to obtain the required values. Additionally, drying, humidifying or other conventional operations can be employed after mixing the two portions to bring about the desired values.

In preparing the dual-textured food from its component soft, meat-like and dry, crunchy portions, these two components are simply mixed in any suitable device to obtain a ratio of the portions which is effective in providing the pet with the desired textural advantages. Typically, these portions will be mixed in weight ratios of from 1:5 to about 5:1, with preferred ratios being from about 1:2 to about 2:1. Equal weights of the two portions are presently preferred.

While the exact size of the individual pieces is not presently known to be of critical importance, they have maximum dimensions of from about ¼ to about 2 inches, and preferably between ½ inch and 1½ inches. Desirably, the two portions should not be grossly disproportionate in size, with the weight of a typical soft piece being from 0.25 to 2 times, preferably 0.5 to about 1.5 times, the weight of a crunchy piece.

The product can be packaged by conventional equipment into conventional moisture impermeable containers.

The following examples are presented for the purpose of further illustrating and explaining the present invention and are not to be taken as limiting in any regard. Unless otherwise indicated, all parts and percentages are by weight.

EXAMPLE I

A pet food simulating meat chunks, and containing ten percent fresh meat, is prepared from the following formulation:

| Ingredient | Parts |
|---|---|
| Whole Ground Wheat (winter) | 18.10 |
| Corn Flour | 15.50 |
| Poultry Meal | 15.00 |
| Brewers Yeast | 2.00 |
| Sucrose | 5.50 |
| Iodized Salt | 1.50 |
| Soy Flour | 14.80 |
| Potassium Sorbate | 0.05 |
| Vitamin Premix | 1.05 |
| Beef Trims | 10.00 |
| Propylene Glycol | 4.00 |
| 16 DE Corn Syrup | 13.00 |
| Corn Oil | 1.00 |

These materials are mixed for 5 minutes in a ribbon blender and fed to a steam jacketed preconditioner where the blend is cooked for ½ minute to a final temperature of 200° F. Live steam is injected into the preconditioner during cooking and the steam in the jacket is supplied at a pressure of 60 psig. Sufficient water is added during this stage to maintain the moisture content at 25%. From the preconditioner, the material is fed to a Wenger X-25 extruder. The extruder screw is run at about 675 RPM and advances the material through the extruder and through a single ⅜ inch hole in the die plate. The material just before the die plate is at a temperature of 275° F. The product expands to just less than twice the diameter of the die orifice upon leaving the extruder. A blade, spaced about 3/16 inch from the die plate, intermittently passes the opening in the die plate and severs the product into chunks by a ripping action. The product is cooled to room temperature, coated with about 4% bleachable fancy tallow, and packaged in moisture-proof pouches. The product has a moisture content of 18% and an $a_w$ of 0.80.

EXAMPLE II

A pet food similar to that of Example I, but having 20% fresh meat, is prepared from the following formulation:

| Ingredient | Parts |
|---|---|
| Whole Ground Wheat (winter) | 15.5 |
| Corn Flour | 13.0 |
| Poultry Meal | 15.0 |
| Brewers Yeast | 2.0 |
| Sucrose | 5.5 |
| Iodized Salt | 1.5 |
| Soy Flour | 13.0 |
| Potassium Sorbate | 0.05 |
| Vitamin Premix | 0.03 |
| Beef Trims | 20.0 |
| Propylene Glycol | 4.0 |
| 64 DE Corn Syrup | 10.0 |

-continued

| Ingredient | Parts |
| --- | --- |
| Corn Oil | 1.0 |

This formulation is processed in the same manner as that in Example I, except that the water added to the preconditioner is reduced to achieve the same final moisture of 18%. This product has an $a_w$ of 0.80.

EXAMPLE III

A pet food similar to that of Example I, but containing 25% fresh meat, is prepared from the following formulation:

| Ingredient | Parts |
| --- | --- |
| Whole Ground Wheat (winter) | 14.5 |
| Corn Flour | 14.5 |
| Poultry Meal | 10.0 |
| Brewers Yeast | 2.0 |
| Sucrose | 5.0 |
| Iodized Salt | 1.5 |
| Soy Flour | 13.0 |
| Potassium Sorbate | 0.05 |
| Vitamin Premix | 0.03 |
| Beef Trims | 25.0 |
| Propylene Glycol | 4.0 |
| 64 DE Corn Syrup | 10.0 |
| Safflower Oil | 1.0 |

This formulation is processed in the same manner as that in Example I, except that no water is added. The product has a moisture content of 20%, and an $a_w$ of 0.80.

EXAMPLE IV

To show the advantages of the present soft-moist pet food versus a high quality soft-moist product of conventional formulation made by standard soft-moist processing, the following samples were prepared and fed to a 60 dog panel:

(1) A product prepared in accordance with Example II containing 20% meat and having a moisture of 16.2%;

(2) The formulation of Example II, but processed according to the procedure described in Burgess et al U.S. Pat. No. 3,202,514, e.g. hot processing followed by cold extrusion, to obtain a moisture content of 18.6%;

(3) A soft moist formulation of the type discussed in Burgess et al U.S. Pat. No. 3,202,514 containing about 35% meat and meat by products, 32% soy flakes, 17% sucrose, 5.1% propylene glycol, 4.7% minor ingredients such as vitamins, etc., 3.0% corn syrup, 2% soy hulls and water for processing processed in accordance with the procedure of Example II to achieve a final moisture content of 31.0;

(4) A soft-moist formulation as in (3) but processed as in (2) to achieve a final moisture content of 29.5.

The results of the feeding study showed the following:

Sample (1) as preferred to (2);
Sample (1) was preferred to (3);
Sample (1) showed between a no-difference to a moderate preference versus (4);
Sample (2) did not differ from (3);
Sample (2) did not differ from (4); and
Sample (3) did not differ from (4).

Thus, while both Samples (3) and (4) had high levels of meat, sugar, and moisture, all known positive factors for improving palatability, the product of the present invention (1) was clearly, unexpectedly better.

EXAMPLE V

To prepare a dual-textured pet food according to the present invention, a soft portion prepared substantially in accordance with Example II is combined with a dry portion prepared as follows:

SOFT PORTION

The formulation and procedure of Example II are repeated but this time 7.5% glycerol is added to the formulation to reduce the $a_w$ of the final product to about 0.60.

DRY PORTION

The dry portion is made from the following ingredients:

| Ingredients | Parts |
| --- | --- |
| Whole Ground Winter Wheat | 44.70 |
| Whole Ground Corn | 21.70 |
| Soy Bean Oil Meal | 17.70 |
| Poultry Meal | 9.25 |
| Sodium Chloride | 1.20 |
| Bleachable Fancy Tallow | 6.00 |
| Hydrolyzed Vegetable Protein | 0.50 |
| Vitamin Premix | 0.03 |

The ingredients, with the exception of the bleachable fancy tallow and the hydrolyzed vegetable protein, are mixed and fed to the entrance of an extruder-cooker operating at temperatures up to 290° F. After a residence time of about 15 seconds the mixture exits through a circular extruder die orifice at a temperature of about 180° F. (measured about 2 inches from the orifice) and a moisture of about 23%. The pressure just before the die orifice is about 300 psig. The now expanded porous mixture is cut into kibs 1 inch long, ½ inch wide, and ⅜ inches thick, using a space cut with the cutting knife positioned ¼ inch away from the extruder orifice. The kibs are then placed on a drying belt and dried at 200° F., and one cooling zone at ambient air conditions, with the dried kibs exiting the drier at about 80° F. and 10% moisture. Liquified tallow and the hydrolyzed vegetable protein are then applied to kibs by mixing and spraying in a fine mist onto the kibs at about 140° F. These chunks show an $a_w$ of about 0.60.

These soft and crunchy portions are then mixed at a weight ratio 1:1 and packaged in moisture impermeable containers.

EXAMPLE VI

Another Example of a dual-textured pet food is prepared as follows:

SOFT PORTION

The following formulation is processed according to the procedure of Example I except that a slurry containing the beef gullets, rendered pork rinds, glycerine and propylene glycol is precooked for about 20 minutes at a temperature within the range of from 180° to 212° F. prior to mixing with the other ingredients:

| Ingredient | Parts |
| --- | --- |
| Soyal Meal (44% Protein) | 26.4 |
| Corn Flour | 20.4 |

| Ingredient | Parts |
|---|---|
| Rendered Pork Rinds | 10.0 |
| Beef Gullets | 10.0 |
| Glycerine | 7.0 |
| Wheat Shorts | 6.40 |
| Meat Meal | 5.21 |
| Sugar - Regular Fine | 5.00 |
| Propylene Glycol | 4.50 |
| Poultry Fat | 3.00 |
| Iodized Salt | 1.25 |
| Fish Meal | 0.695 |
| Whey Powder | 0.640 |
| Sodium Propionate | 0.125 |
| Potassium Sorbate | 0.125 |
| Vitamins and Minerals | 0.125 |
| Color | 0.030 |

DRY PORTION

The dry portion is made from the following ingredients according to the procedure of Example V:

| Ingredient | Parts |
|---|---|
| Corn | 30.7 |
| Wheat Shorts | 22.5 |
| Meat and Bone Meal | 18.0 |
| Soya Meal (44% Protein) | 12.6 |
| Cereal By-Product | 10.0 |
| Tallow | 4.00 |
| Fish Meal | 0.730 |
| Whey Powder | 0.730 |
| Iodized Salt | 0.500 |
| Vitamins and Minerals | 0.172 |
| Color | 0.0860 |

The soft and dry portions are mixed at a weight ratio of 2 parts of the soft to 1 part of the dry.

EXAMPLE VII

A further dual textured pet food is prepared as follows:

SOFT PORTION

The following formulation is processed according to the procedure of Example I:

| Meat Chunk | Parts |
|---|---|
| Wheat, Whole Ground | 16.43 |
| Corn, Whole Ground | 13.25 |
| Poultry By-Product Meal | 13.69 |
| Yeast, Brewer's Dried | 1.70 |
| Soy Bean Oil Meal 44% | 11.00 |
| Steamed Bone Meal | 1.50 |
| Calcium Carbonate | 0.80 |
| Vitamin Premix B | 0.03 |
| Color | 0.03 |
| Potassium Sorbate | 0.05 |
| Salt, Iodized | 1.50 |
| Propylene Glycol | 4.00 |
| Soy Oil | 1.00 |
| Trimmings, Beef, Denatured or Clean | 20.00 |
| High Fructose Corn Syrup (Isomerose) | 12.52 |
| Glycerol | 2.50 |

DRY PORTION

The dry portion is made from the following ingredients according to the procedure of Example V:

| Ingredient | Parts |
|---|---|
| Wheat, Whole Ground | 44.86 |
| Corn, Whole Ground | 21.76 |
| Soybean Meal, 44% | 17.70 |
| Poultry By-Product Meal | 8.25 |
| Salt, Iodized | 1.20 |
| Tallow, Bleachable Fancy | 5.00 |
| Vitamin Premix | 0.03 |
| Potassium Sorbate | 0.10 |
| Hydrolyzed Vegetable Protein | 0.10 |
| Steamed Bone Meal | 1.00 |

Three parts of the soft portion are mixed with two parts of the dry portion to form the final product which is packaged in moisture resistant packaging material.

EXAMPLE VIII

Another dual-textured pet food is prepared as in Example VI, but this time employing the following ingredients in preparing the soft portion.

SOFT PORTION

| Ingredient | Parts |
|---|---|
| Whole Ground Wheat | 18.25 |
| Whole Ground Corn | 13.00 |
| Poultry Meal | 6.00 |
| Meat Meal | 6.00 |
| Soy Flour | 4.00 |
| Steamed Bone Meal | 1.50 |
| Salt, Iodized | 1.00 |
| CaCO$_3$ | 0.80 |
| K. Sorbate | 0.15 |
| Vitamin Premix | 0.03 |
| Color | 0.03 |
| Propylene Glycol | 4.00 |
| Beet Trims | 10.00 |
| High Fructose Corn Syrup | 9.00 |
| Soy Oil | 1.00 |
| Brewer's Yeast | 1.50 |
| H$_2$O | 21.84 |

The above description is for the purpose of teaching those skilled in the art how to practice the present invention and is not intended to describe all obvious modifications and variations which will become apparent upon reading the description. It is intended, however, that all such modifications and variations be included within the scope of the present invention which is defined by the following claims.

What is claimed is:

1. A pet food comprised of resilient, textured, meat-like chunks having an expanded structure internally and an external substantially-continuous, fibrous, highly-irregular skin, having a moisture content in the range of from greater than 16% up to 20%, an $A_w$ of from 0.50 to 0.75, a resilience within the range of from 30% to 50%, a bulk density of from 18 to 25 lb/ft$^3$, and from above 25 to about 60% farinaceous material and from 2 to 15% of a polyhydric alcohol in combination with a dry crunchy portion having an $A_w$ substantially the same as the meat-like chunks and a firmness of at least 1400 lb/in$^3$.

* * * * *

UNITED STATES PATENT OFFICE
CERTIFICATE OF CORRECTION

Patent No. 4,190,679  Dated Feb. 26, 1980

Inventor(s) Harold R. Coffee et al.

It is certified that error appears in the above-identified patent and that said Letters Patent are hereby corrected as shown below:

On cover page change " Assignee: General Foods Corporation, White Plains, N.Y."
to --Assignee: General Foods Limited, Ontario, Canada --.

Signed and Sealed this

Twenty-eighth Day of July 1981

[SEAL]

Attest:

Attesting Officer

GERALD J. MOSSINGHOFF

Commissioner of Patents and Trademarks